(12) United States Patent
Kleemann et al.

(10) Patent No.: US 6,762,881 B2
(45) Date of Patent: Jul. 13, 2004

(54) OPTICAL ARRANGEMENT, LITTROW GRATING FOR USE IN AN OPTICAL ARRANGEMENT AND ALSO USE OF A LITTROW GRATING

(75) Inventors: Bernd Kleemann, Schelmenstr. (DE); Michel LeMaire, Meisengasse (DE)

(73) Assignee: Carl Zeiss Laser Optics GmbH (DE)

( * ) Notice: Subject to any disclaimer, the term of this patent is extended or adjusted under 35 U.S.C. 154(b) by 38 days.

(21) Appl. No.: 10/299,031

(22) Filed: Nov. 18, 2002

(65) Prior Publication Data

US 2003/0151816 A1 Aug. 14, 2003

(30) Foreign Application Priority Data

Nov. 29, 2001 (DE) .......................................... 101 58 638

(51) Int. Cl.$^7$ ................................................. G02B 5/18
(52) U.S. Cl. ........................ 359/572; 359/569; 359/566; 372/102
(58) Field of Search ................................ 359/566, 572, 359/573, 569, 900, 571; 372/102

(56) References Cited

U.S. PATENT DOCUMENTS

| 6,067,197 A | 5/2000 | Blasiak et al. |
| 2003/0090802 A1 * | 5/2003 | Fabiny et al. ............... 359/569 |

\* cited by examiner

*Primary Examiner*—Drew A. Dunn
*Assistant Examiner*—Fayez Assaf
(74) *Attorney, Agent, or Firm*—Factor & Lake

(57) ABSTRACT

An optical arrangement has a light source which emits coherent light of a specific wavelength. Further provided is an optical Littrow grating, arranged at a specific Littrow angle $\theta_L$. It has a multiplicity of parallel diffraction structures following one another periodically at an interval in each case of one specific grating period and arranged on a substrate predetermining a base area. The light wavelength, the grating period and the Littrow angle $\theta_L$ are tuned to one another in such a way that the grating is used in one of the largest diffraction orders m for light reflected back at the Littrow angle $\theta_L$, which still fulfils the condition:

$$(2(m+1)/m-1)\sin(\theta_L) \geq 1$$

An optical arrangement of this kind has an increased reflection efficiency.

11 Claims, 9 Drawing Sheets

OPTICAL ARRANGEMENT, LITTROW GRATING FOR USE IN AN OPTICAL ARRANGEMENT AND ALSO USE OF A LITTROW GRATING

BACKGROUND OF THE INVENTION

The invention relates to an optical arrangement with a light source, which emits coherent light of a specific wavelength, and with an optical Littrow grating, arranged at a specific Littrow angle $\theta_L$, with a multiplicity of parallel diffraction structures, following one another periodically at an interval of in each case one specific grating period and arranged on a substrate predetermining a base area.

The invention further relates to a Littrow grating for use in an optical arrangement with a light source which emits coherent light of a specific wavelength, arranged at a specific Littrow angle $\theta_L$, with a multiplicity of parallel diffraction structures, following one another periodically at an interval of in each case one specific grating period and arranged on a substrate predetermining a base area.

The invention further relates to a use of a Littrow grating.

An optical arrangement and a Littrow grating of the kind initially mentioned are known from U.S. Pat. No. 6,067,197 A. There reference is made to the fact that the reflection efficiency of the Littrow grating is increased if it is operated in Littrow diffraction orders for which no radiation with an even higher diffraction order exists. The Littrow grating in the optical arrangement of U.S. Pat. No. 6,067,197 A, after calculation there for light of a KrF laser incident with TM polarisation at 248.4 nm in the 95th Littrow diffraction order, has a reflection efficiency of approximately 75%. Calculations by the applicant resulted in a lower reflection efficiency in the range of 68% for a comparable optical arrangement. This difference can probably be attributed to different assumptions in calculating the reflection efficiency. Losses linked to this reflection efficiency in the order of magnitude of a third of the irradiated energy represent a considerable limitation for many applications.

It is therefore the object of the present invention to develop further an optical arrangement of the initially mentioned kind in such a way that its reflection efficiency is raised.

SUMMARY OF THE INVENTION

This object is achieved according to the invention in that the light wavelength, the grating period and the Littrow angle $\theta_L$ are tuned to one another in such a way that the grating is used in one of the largest diffraction orders m for light reflected back at a Littrow angle $\theta_L$, which still fulfils the condition:

$$(2(m+1)/m-1) \sin (\theta_L) \geq 1$$

Hereinafter the last still propagating Littrow diffraction order is understood to be that for which no further radiation of higher diffraction order exists which would emerge at an even larger emergent angle than the Littrow angle $\theta_L$, in other words as even flatter related to the base area of the substrate.

According to the invention it has been recognised that the reflection efficiency of a generic optical arrangement can be raised in that not just any of the Littrow diffraction orders which is the last still propagating diffraction order is selected, but that further selection is made among the Littrow diffraction orders which are the last still propagating diffraction orders. From the cited condition an optical arrangement results with a Littrow diffraction order which is one of the largest among the last still propagating diffraction orders. The reflection efficiency for a Littrow diffraction order selected in this way is the highest, compared with all the other diffraction orders which fulfil the condition of being the last still propagating Littrow diffraction order. Targeted selection according to the above condition therefore leads to an optical arrangement with increased reflection efficiency.

The light of the light source preferably has a TM polarisation in respect of the Littrow grating. There is a relatively large increase potential for reflection efficiency for this polarisation direction, as is known, TM polarised light is usually reflected with lower efficiency than TE polarised light. However, according to the above selection, an increase in reflection can also be achieved for TE polarised light.

Preferably a light wavelength is used which is smaller than 350 nm. An optical arrangement with a light wavelength of this kind acts, e.g. as an end mirror of a laser resonator, for which the increase in reflection efficiency can be particularly well used.

A further object of the invention is to develop further a Littrow grating of the kind initially mentioned in such a way that its reflection efficiency is raised.

This object is achieved according to the invention by a Littrow grating in which the light wavelength, the grating period and the Littrow angle $\theta_L$ are tuned to one another in such a way that the grating is used in one of the largest diffraction orders m for light reflected back at a Littrow angle $\theta_L$, which still fulfils the condition:

$$(2(m+1)/m-1) \sin (\theta_L) \geq 1$$

A Littrow grating of this kind can be configured in such a way that the advantages of the increase in efficiency by targeted selection of the Littrow diffraction order can be used for a series of optical arrangements, which differ slightly in the light wavelengths or the Littrow angles. Further advantages of the Littrow grating emerge from those depicted above in connection with the optical arrangement.

The diffraction structures of the Littrow grating can in each case have a blaze flank inclined substantially at the Littrow angle $\theta_L$ to the base area. Structuring of this kind leads to even further optimised reflection efficiency.

The diffraction structures can therein comprise a counter-flank, wherein the blaze flank and the counter-flank form at the vertex of a diffraction structure an apex angle which is smaller than 90°. Alternatively the apex angle can also be larger than or equal to 90°.

The Littrow grating can consist of quartz glass. In this material the diffraction structures can be relatively easily produced with good optical quality. Alternatively the Littrow grating can also consist of some other dielectric material.

The Littrow grating can have a coating which increases reflectivity. It can in this case consist of a material easily processed in optical quality, which does not itself reflect the radiation, as is the case with Quartz glass or silicon, for example.

The coating can be an aluminium coating. A coating of this kind is relatively economical to produce and maintains a very good reflection efficiency, in particular for UV light.

A further object of the invention is to cite a use for a Littrow grating according to the invention, in which the dependency of the largest diffraction order m, for which now no output radiation, reflected at a larger emergent angle than the incident angle, of higher diffraction order exists, on the incident angle for irradiated light and therefore selectivity of the reflection efficiency in respect of the incident angle can be used.

This object is achieved by the use of a Littrow grating according to the invention to reduce the divergence of the light source. If the irradiation angle into the Littrow grating according to the invention is chosen in such a way that there are spectral portions within the irradiated light beam with irradiation angles for which an output radiation of higher diffraction order with an emergent angle larger than the irradiation angle results, these portions are reflected by the Littrow grating with less efficiency than those portions of the incident light beam for which no output radiation of this kind of higher diffraction order exists. Distribution of the light beam into the portions reflecting back efficiently and less efficiently can be influenced via the irradiation angle of the main ray of the light beam.

This further object is further achieved by using a Littrow grating according to the invention as the end mirror in a laser resonator for narrowing bandwidth.

BREIF DESCRIPTION OF THE DRAWINGS

Embodiment examples of the invention are explained in greater detail below using the drawings, wherein.

DETAILED DESCRIPTION OF THE DRAWINGS

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments so illustrated.

Figure 1:
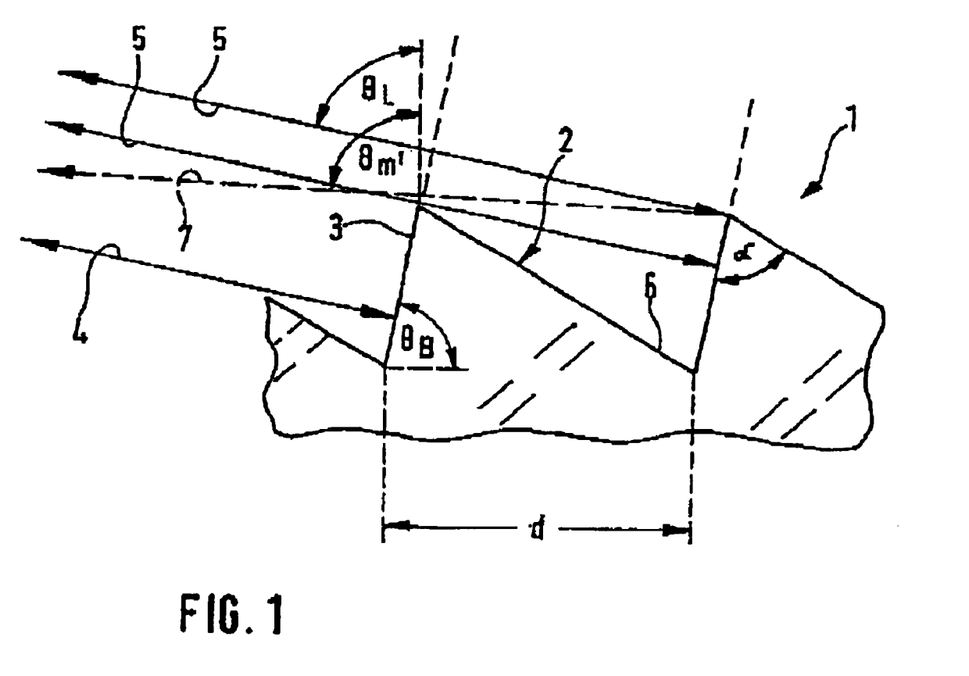
FIG. 1 shows a greatly enlarged detail from a section made perpendicular to the extension direction of diffraction structures through an optical Littrow grating.

FIG. 1 shows the reflection ratios in a Littrow grating, designated overall by the reference numeral 1, of which individual diffraction structures 2 are illustrated in a greatly enlarged detail cut perpendicular to the extension direction of the diffraction structures 2. The latter have in the plane of projection of FIG. 1 a cross-section shaped like the teeth of a saw and have in each case a blaze flank 3, on which incident light rays 4, 5 are reflected. The diffraction structures 2 further comprise in each case a counter-flank 6, which connects two blaze flanks 3 to one another to complete the cross-section of the diffraction structures 2 shaped like the teeth of a saw.

The diffraction structures 2 are mounted on a substrate not illustrated in FIG. 1. The substrate consists, e.g. of silicon or doped quartz glass. To increase the reflectivity the diffraction structures 2 can have an aluminium coating.

The blaze flanks 3 and the counter-flanks 6 enclose together an apex angle $\alpha$ of 70.5° on the saw-tooth tips visible from the section in FIG. 1.

In the Littrow arrangement illustrated in FIG. 1 those light rays 4, 5 which after being reflected on the blaze flanks 3 are reflected back into themselves are used. The Littrow angle $\theta_L$ results from the diffraction condition $$m\lambda = 2\, d \sin(\theta_L) \tag{1}$$

Herein m is the diffraction order of the Littrow grating 1, $\lambda$ the wavelength of the light rays 4, 5, which in the embodiment example being considered, in which a KrF laser is used as light source, is 284.4 nm, d the grating constant, i.e. the interval between two successive diffraction structures 2, and $\theta_L$ the Littrow angle.

The blaze flank 3 is inclined with respect to the base area predetermined by the substrate by an angle $\theta_B$, which, to achieve optimal reflection efficiency in the Littrow arrangement, has a size which coincides with the Littrow angle $\theta_L$ within a tolerance range of ±1°.

In the Littrow arrangement according to FIG. 1, as can be seen from FIGS. 2, 4, 6 and 8, the reflection efficiency depends on the Littrow diffraction order (hereinafter abbreviated to "diffraction order" or "order"). With a predetermined Littrow angle (78.7°) and predetermined wavelength $\lambda$, the diffraction order, as follows from diffraction condition (1), can be varied only via the grating constant d.

FIGS. 2, 4, 6 and 8 and also the corresponding FIGS. 3, 5, 7 and 9, which all result from electromagnetic-optical calculations, therefore show the optical properties of various embodiments of Littrow gratings with diffraction structures 2 according to FIG. 1, which differ in their grating constant d and therefore in their diffraction order m.

Figure 2:
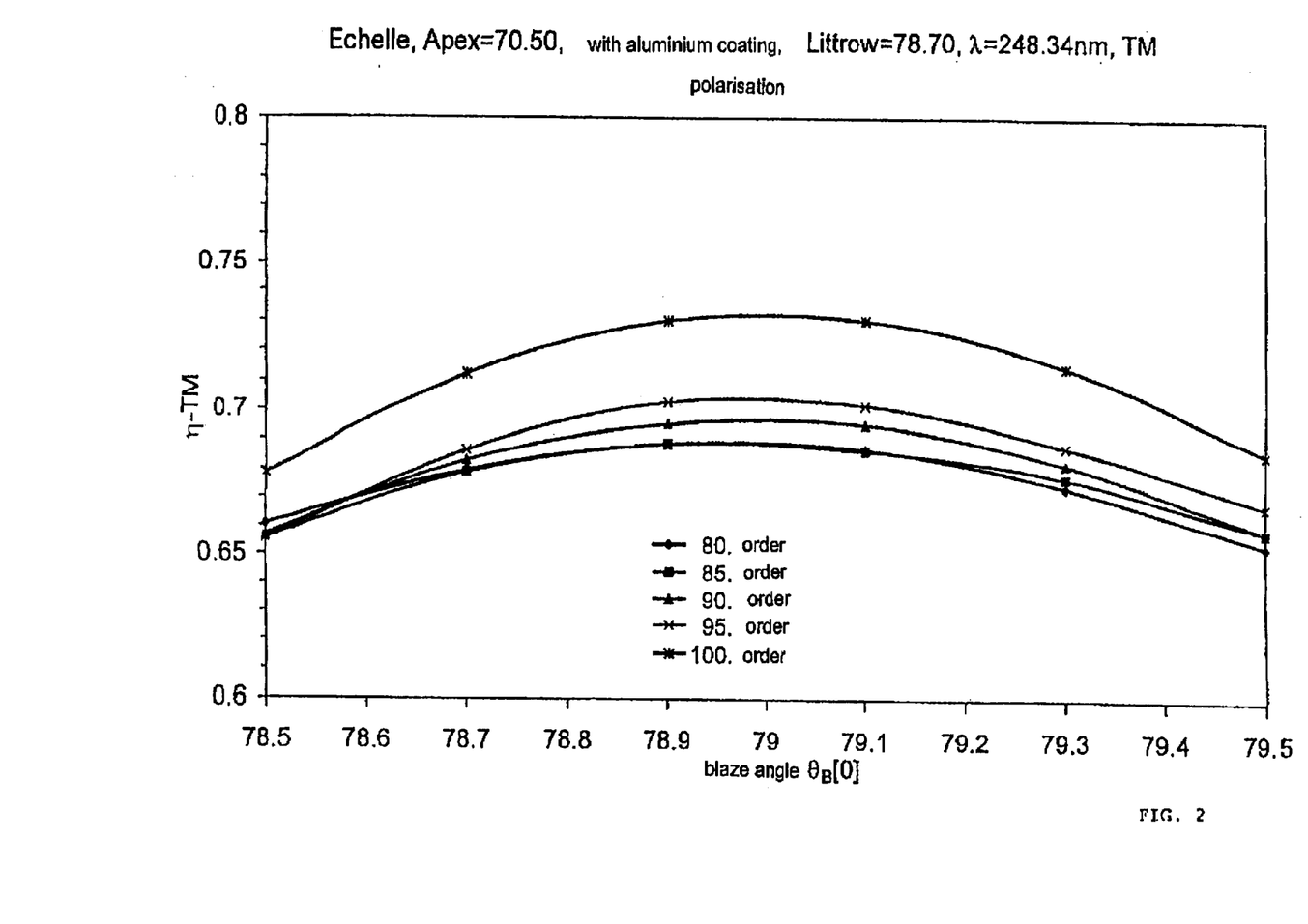
FIGS. 2 and 4 show reflection efficiency curves for light irradiated with TM polarisation on to gratings according to FIG. 1 with different grating periods, depending on the blaze angle of the grating structures.

In FIG. 2 the change in reflection efficiency is illustrated as a function of the blaze angle $\theta_B$ for Littrow gratings according to FIG. 1 for various values of the diffraction order. Light is irradiated here with TM polarisation, i.e. the polarisation direction stands perpendicular on the extension direction of the diffraction strutures 2 and perpendicular to the direction of radiation. A significant increase in reflection efficiency arises, from an optimum in the range of 69% with a Littrow grating operated in the 80th order (diamonds) with a blaze angle of approximately 79° to a reflection efficiency of more than 73% with a Littrow grating operated in the 100th order with a blaze angle of approximately 78.9°. The reflection efficiencies for the 85th (squares), 90th (triangles) and 95th (crosses) orders, with the blaze angles cited, are between the reflection efficiencies predetermined by the 80th and 100th (stars) orders.

Figure 3:
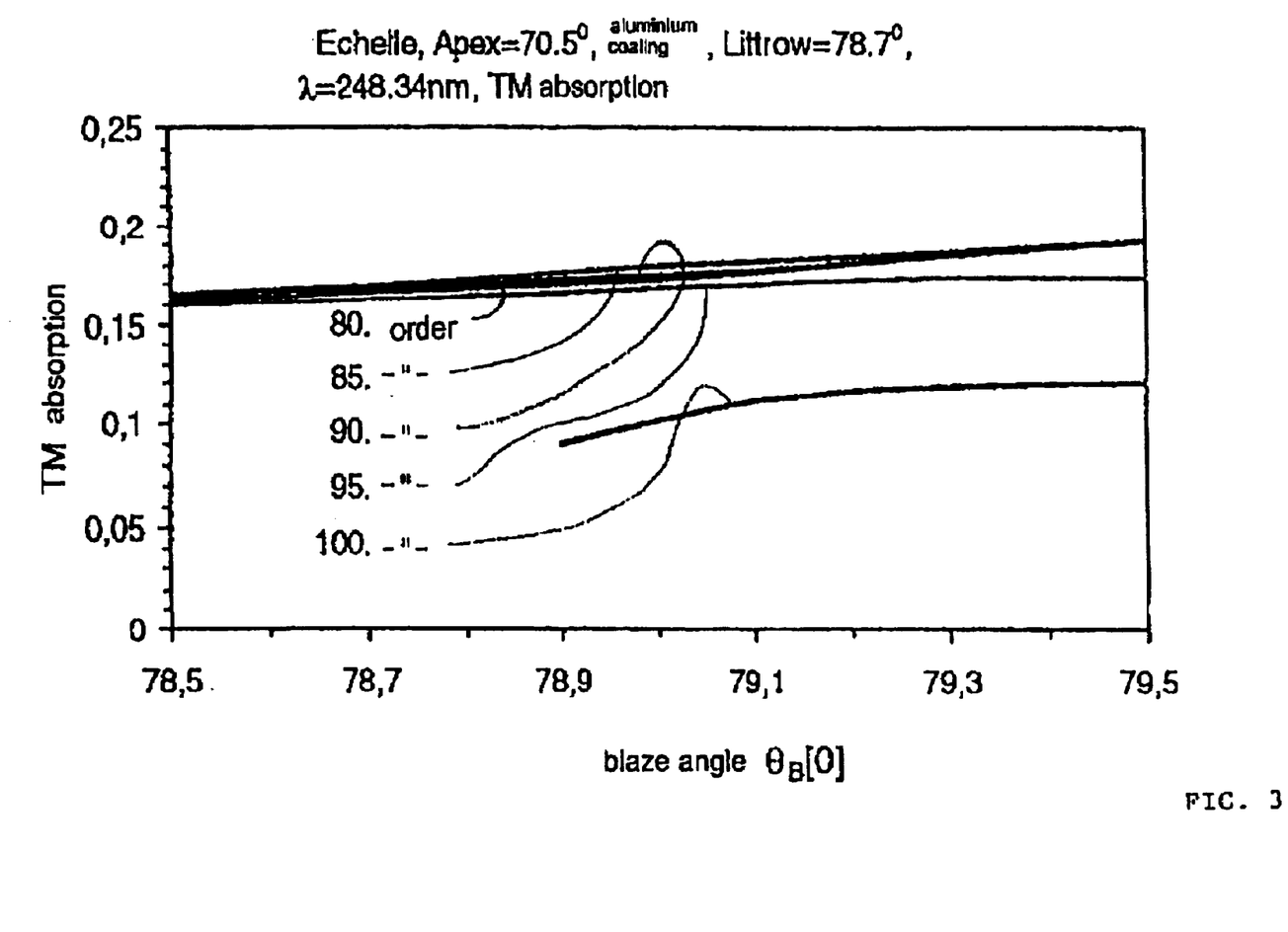
FIGS. 3 and 5 show absorption curves for light irradiated with TM polarisation on to gratings according to FIG. 1 with different grating periods, depending on the blaze angle of the grating structures.

In FIG. 3 the change in absorption is plotted as a function of the blaze angle $\theta_B$ for the diffraction and polarisation ratios according to FIG. 2. The absorption is cited hereinafter in units of the percentage loss of irradiated light energy. As well as the absorption illustrated in FIG. 3, the diffraction of the incident light rays into other orders than the Littrow order used is also to be taken into account as an additional loss factor influencing the reflection efficiency. Therefore the absorption is not usually able to be gained directly from the reflection efficiency of the effective order via energy conservation. From FIG. 3 it follows that with a Littrow grating, the grating period d of which is chosen in such a way that the 100th diffraction order is used, the absorption losses are lowest compared with the other orders illustrated. With a blaze angle of 78.9° the absorption has a value of approximately 9%, while for the Littrow gratings used in lower diffraction orders (80th to 95th) the absorption is in the range of 17% and in the range illustrated depends only insubstantially on the blaze angle.

Figure 4:
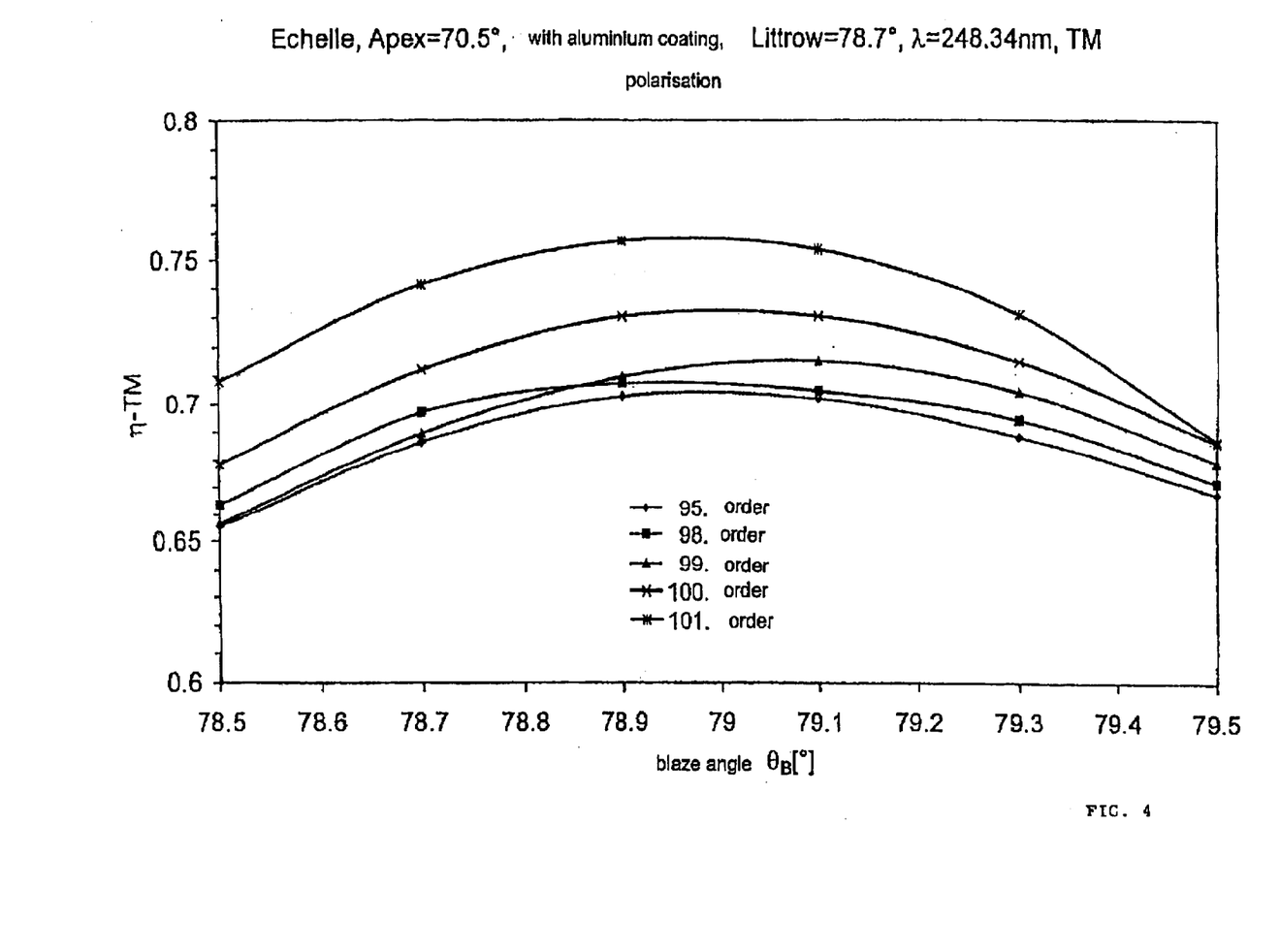
Figure 5:
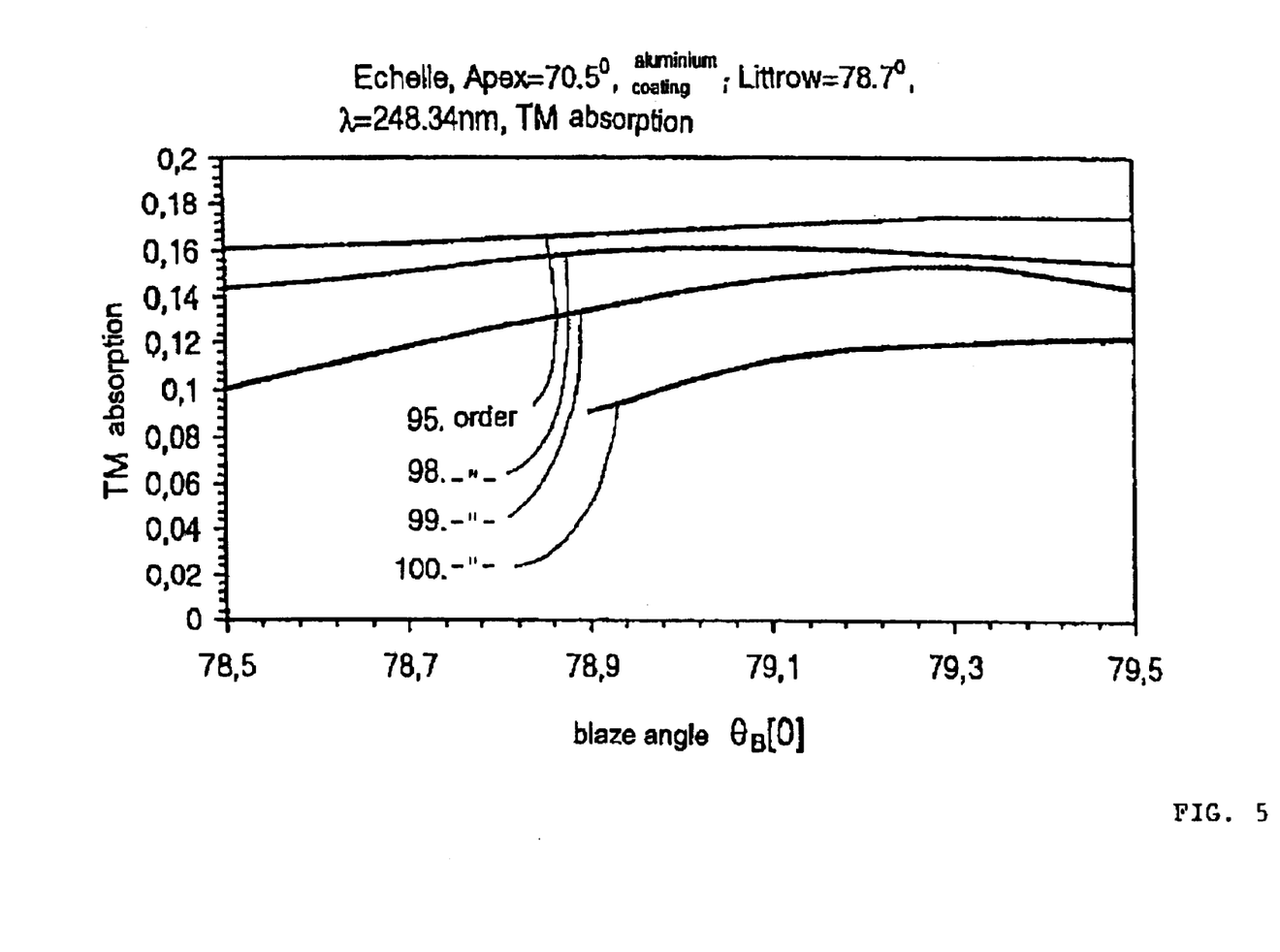

FIGS. 4 and 5 show the reflection efficiency and also the absorption for TM polarised light rays in an illustration analogous to FIGS. 2 or 3, which is identical to the illustration in FIGS. 2 and 3, apart from the choice of grating constants d for the Littrow gratings under consideration, for which corresponding orders result. Instead of, as in FIGS. 2 and 3, illustrating the ratios for the 80th, 85th, 90th, 95th, 100th orders, in FIG. 4 orders 95 (diamonds), 98 (squares), 99 (triangles), 100 (crosses), 101 (stars) and in FIG. 5 orders 95, 98, 99 and 100 are selected. From FIG. 4 it becomes clear that the reflection efficiency for orders around the 100th diffraction order greatly increases and in particular the 101st diffraction order has a greatly increased diffraction efficiency again compared with the 100th diffraction order, which with a blaze angle of approximately 78.7° achieves a maximum value of approximately 79%. Over the entire area of blaze angles illustrated the reflection efficiency with the 101st diffraction order is higher than with all the other diffraction orders illustrated.

For the 95th, 98th, 99th and 100th diffraction orders the increasing reflection efficiency is also reflected (cf. FIG. 4) in a decreasing absorption for TM polarised light rays, as FIG. 5 shows.

For all the Littrow diffraction orders illustrated in FIGS. 2 to 5 the respective Littrow diffraction order is the last propagating diffraction order. This means that for these Littrow diffraction orders there are no light rays 7 (cf. FIG. 1) which emerge in a higher diffraction order m'=m+1 at an even larger angle $\theta_{m'}$ than the Littrow angle $\theta_L$, in other words even flatter in respect of the base area predetermined by the substrate. For emergent angles of this kind larger than the Littrow angle $\theta_L$ no further constructional interference arises with the grating constants d for which, according to diffraction condition (1), diffraction orders according to FIG. 2 result.

Above the 101st Littrow diffraction order illustrated in FIGS. 2 to 5 there exists an emergent angle $\theta_{m'}$ which is larger than the Littrow angle $\theta_L$ and for which the diffraction condition is fulfilled, i.e. for which the emergent light rays (cf. light ray 7 in FIG. 1) constructionally interfere. For an emergent angle $\theta_{m''}$ of this kind the following diffraction condition must be fulfilled:

$$\sin(\theta_{m'}) = (m+1)\lambda/d - \sin(\theta_L) \quad (2)$$

From this emerges, additionally taking into account Littrow condition (1), as the condition for the largest diffraction order m which is still the last propagating Littrow diffraction order:

$$(2(m+1)/m-1)\sin(\theta_L) \geq 1 \quad (3)$$

Figure 6:
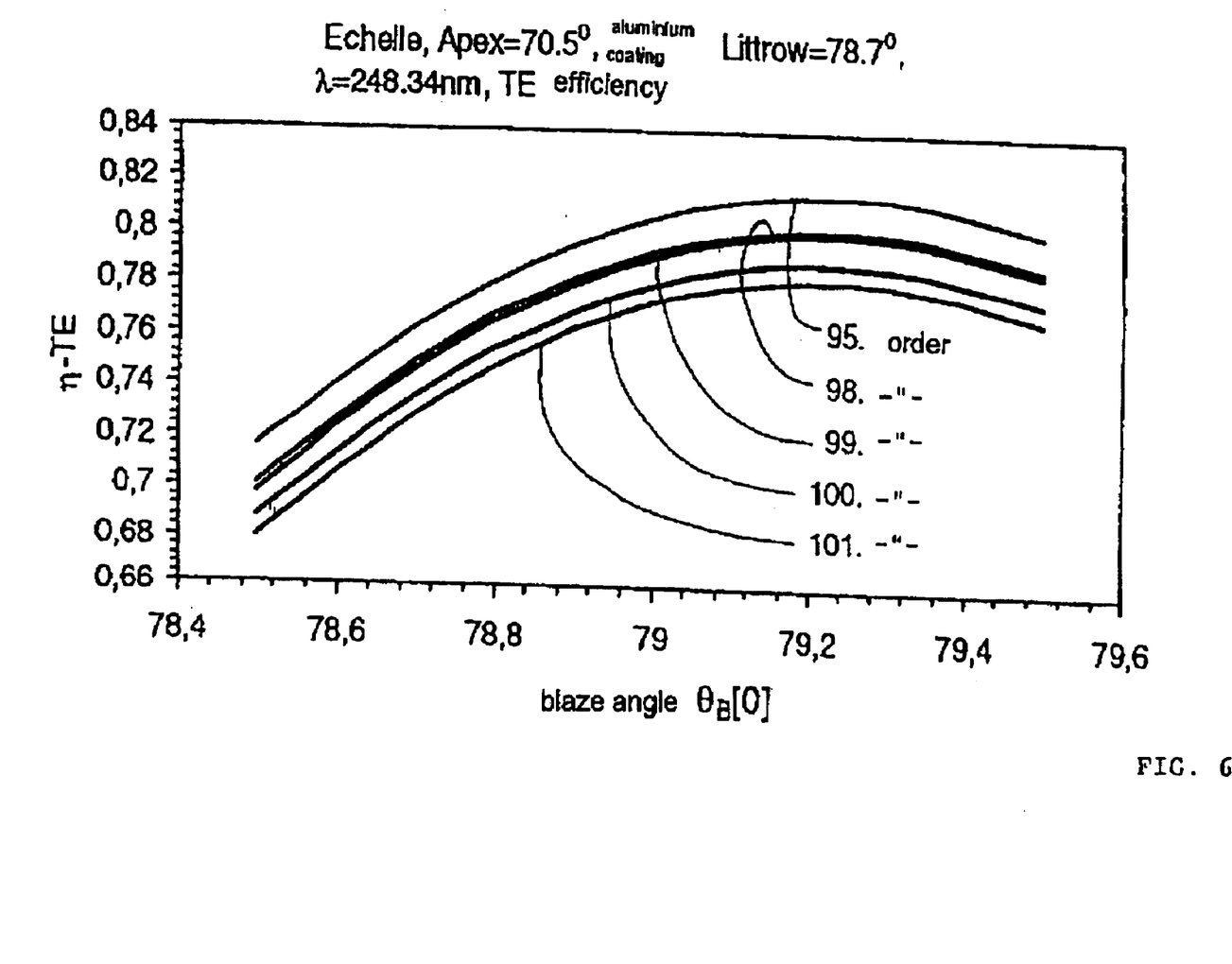
FIGS. 6 and 8 show reflection efficiency curves for light irradiated with TE polarisation on to gratings according to FIG. 1 with different grating periods, depending on the blaze angle of the grating structures.
Figure 7:
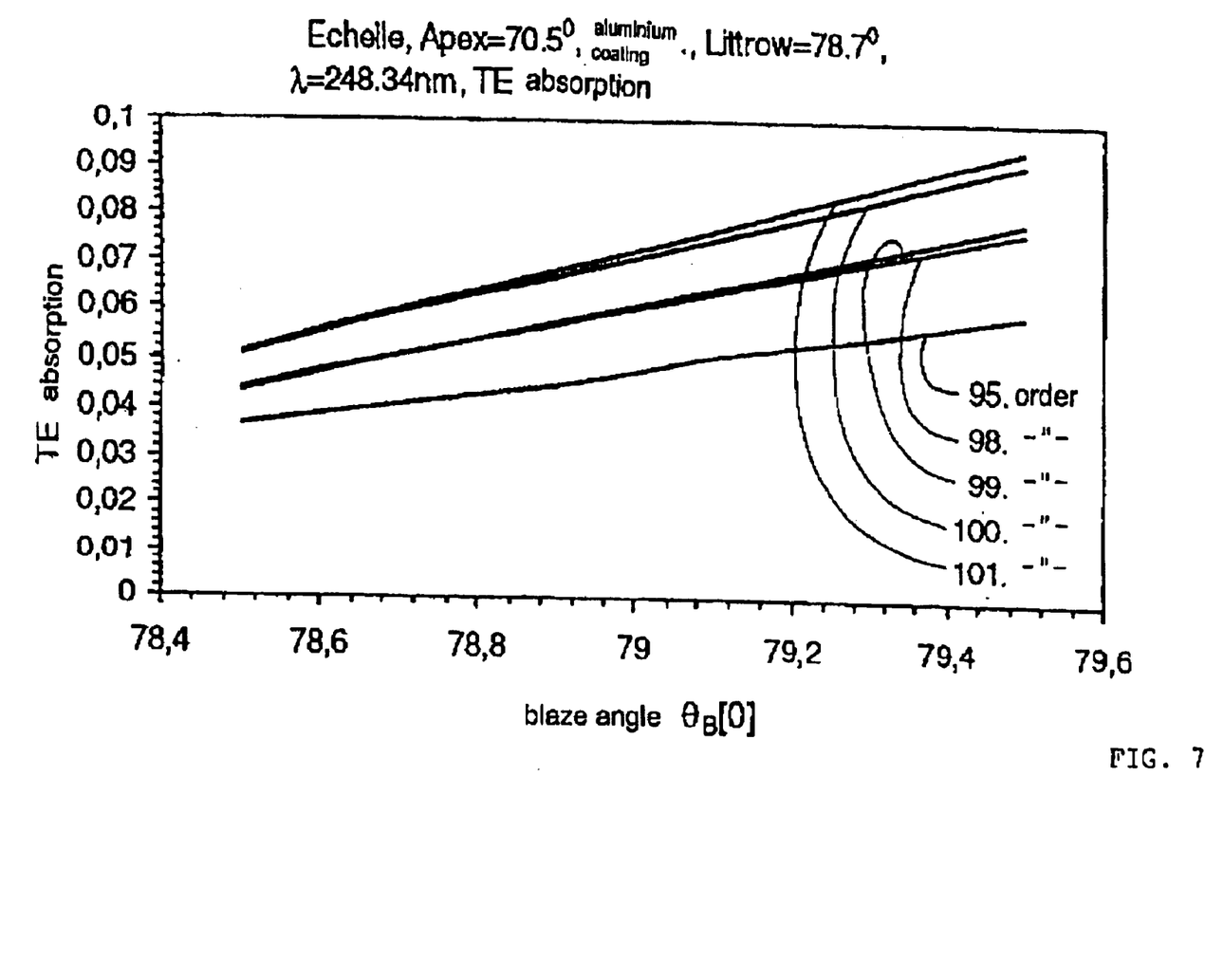
FIGS. 7 and 9 show absorption curves for light irradiated with TE polarisation on to gratings according to FIG. 1 with different grating periods, depending on the blaze angle of the grating structures.
Figure 8:
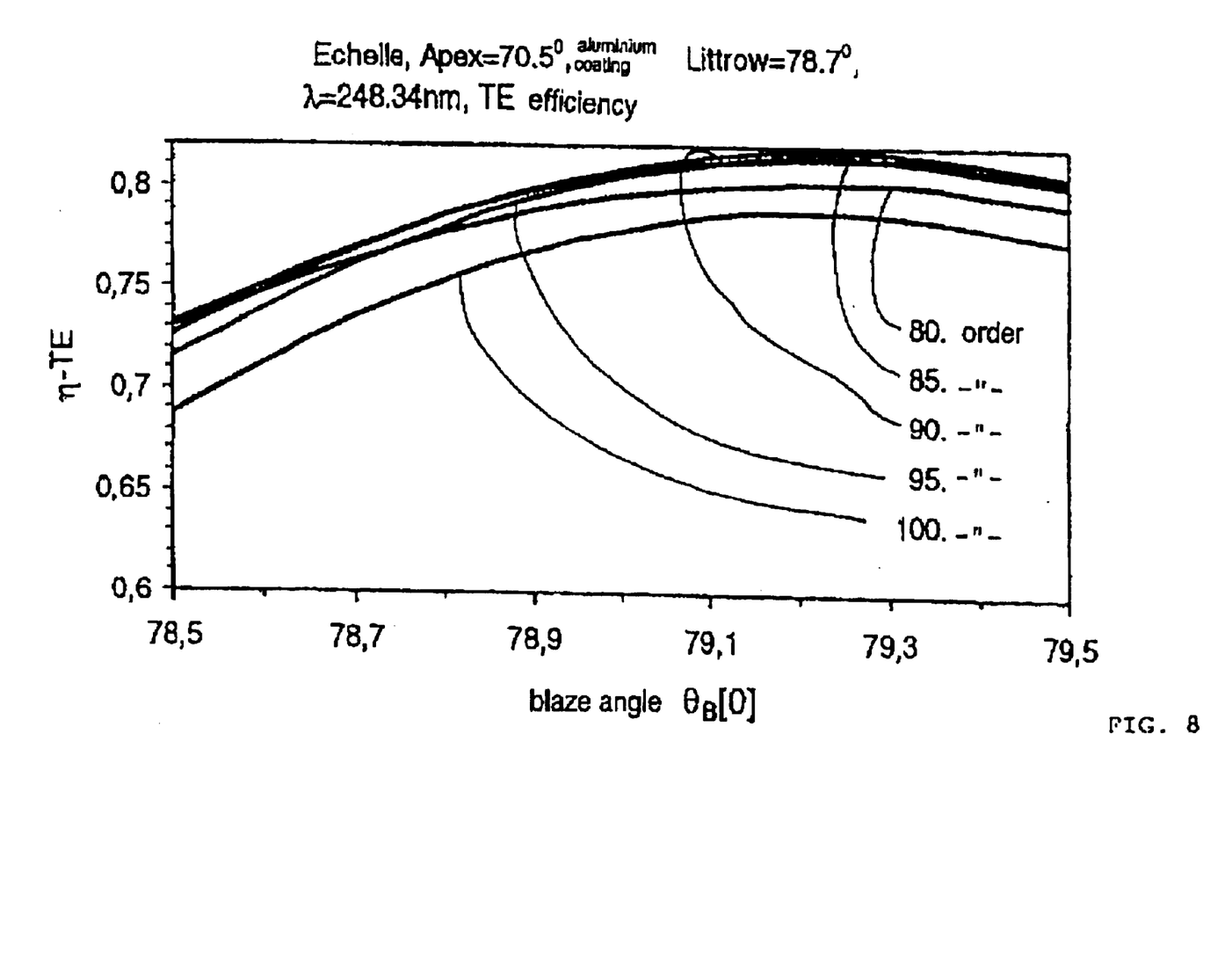
Figure 9:
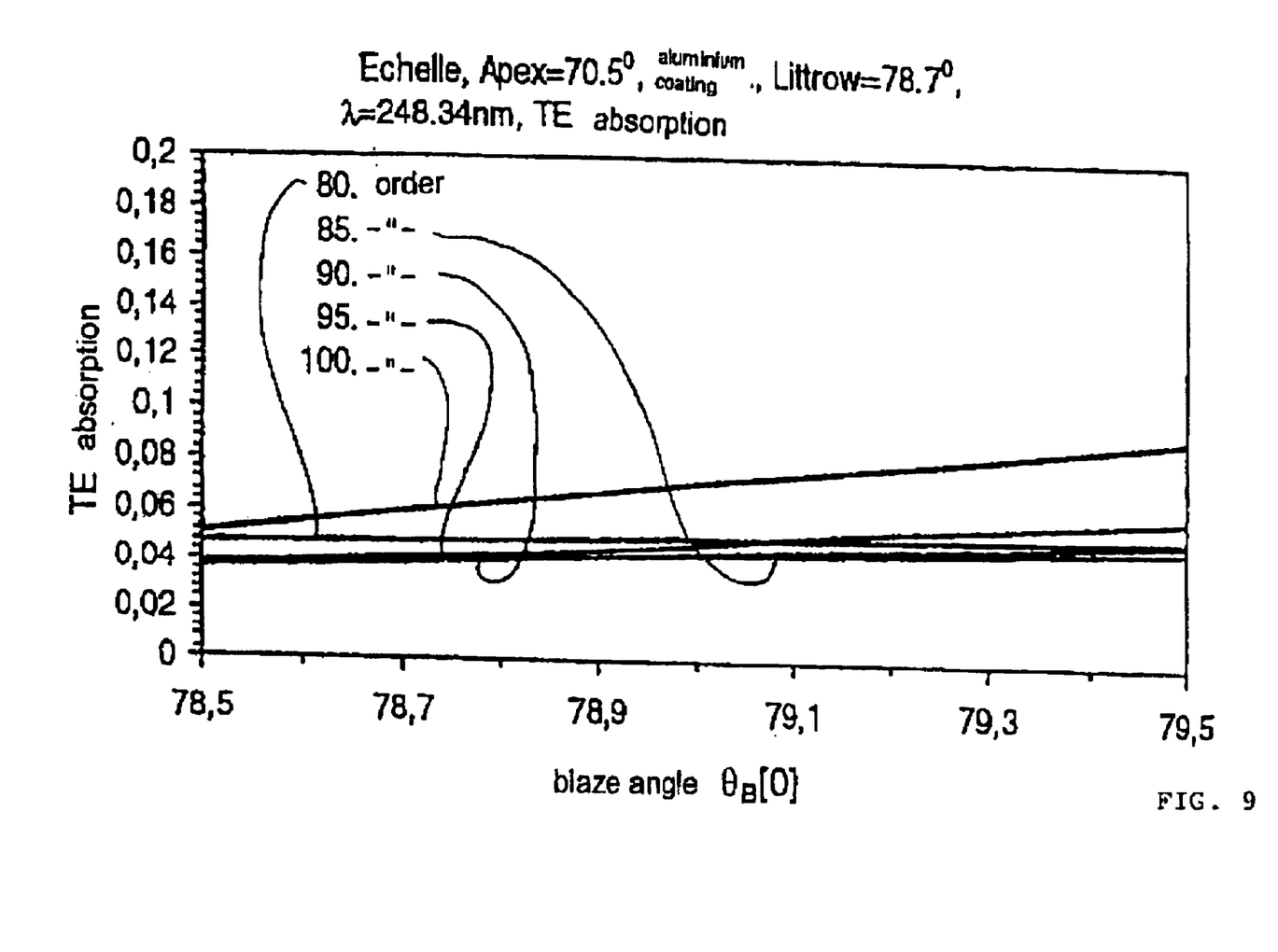

This largest possible last propagating Littrow diffraction order m accordingly now depends only on the Littrow angle $\theta_L$. For the Littrow angle 78.7° of the Littrow grating 1 the diffraction order m=101 emerges as the largest possible last propagating Littrow diffraction order, the reflection efficiency of which is illustrated in FIGS. 4 and 6. For even larger Littrow diffraction orders (m≧102) condition (3) is no longer fulfilled and there exists an output radiation 7 fulfilling diffraction condition (2), which emerges as even flatter in respect of the base area predetermined by the substrate compared with the Littrow effective radiation. Therefore for these even larger diffraction orders the reflection efficiency is greatly reduced compared with the diffraction order m=101.

Analogously to FIGS. 2 to 5, in FIGS. 6 to 9 the efficiency or absorption ratios of Littrow gratings according to FIG. 1 are illustrated for light rays which are polarised parallel to the extension direction of the diffraction structures 2 (TE polarisation). From FIG. 6, which shows the reflection efficiency for light of Littrow diffraction orders 95, 98, 99, 100, 101 as a function of blaze angle $\theta_B$, it emerges that with TE polarisation the reflection efficiency continuously minimally decreases with increasing Littrow diffraction order. At the 80th diffraction order a maximum value of the efficiency of approximately 82% with a blaze angle of 79.2° is achieved. This maximum value drops to a maximum value of approximately 78% with a blaze angle of 79.2° at the 101st Littrow diffraction order. This decrease is both absolutely and relatively smaller than the increase in reflection efficiency with TM polarisation with increasing diffraction order up to the maximum Littrow diffraction order m=101, which is the last propagating Littrow diffraction order (cf. FIG. 4).

By optimising the Littrow diffraction order in the direction of the last still propagating Littrow diffraction order for which a more flatly emerging output radiation 7, which fulfils diffraction condition (2), no longer exists, a simultaneous increase in reflection efficiency for the TM and TE polarisation can also be achieved depending on the geometry of the diffraction structures 2.

Increases in the reflection efficiency emerge for other apex angles for both TM and TE polarisation for the largest Littrow diffraction order which is the last still propagating order.

Condition (3) for the largest Littrow diffraction order which is the last propagating order can also be evaluated from the fact that a Littrow diffraction order m is allocated the smallest reliable irradiation angle $\theta_s$ for which this Littrow diffraction order m is the last propagating order. For Littrow diffraction orders m between 95 and 108, for example, the following value table emerges:

| Littrow diffraction order m | smallest permissible irradiation angle $\theta_S$ |
| --- | --- |
| 95 | 78.345° |
| 96 | 78.405° |
| 97 | 78.464° |
| 98 | 78.522° |
| 99 | 78.579° |
| 100 | 78.636° |
| 101 | 78.691° |
| 102 | 78.746° |
| 103 | 78.800° |
| 104 | 78.853° |
| 105 | 78.905° |
| 106 | 78.957° |
| 107 | 79.008° |
| 108 | 79.058° |

For an irradiated light beam, the main ray of which has a predetermined Littrow angle, e.g. $\theta_L=78.7°$, if firstly only the main ray is considered, each Littrow diffraction order which has a limit angle $\theta_s$ which is smaller than $\theta_L$ is the last still propagating order. If a Littrow diffraction order with $\theta_L \geq \theta_L$ is used; there is at least one output radiation of higher diffraction order emerging at a larger emergent angle compared with the Littrow angle $\theta_L$ and fulfilling the diffraction condition.

If the incident light rays 4, 5 show a divergence, in other words a variation of the irradiation angle of around $\theta_L$ occurs via the incident light ray beam, the low angle tolerance of the last propagating Littrow diffraction order m according to the above table can be used to reinforce a desired band width narrowing of the laser radiation. For example, if a beam of light rays is to be irradiated in a Littrow grating 1 according to FIG. 1 operated in the 101st order, the main ray of which is incident at the Littrow angle $\theta_L$. In this case a divergence of the irradiated light beam which is greater than 0.01° results in the fact that for the rays which have an irradiation angle which is smaller than 78.691°, in other words the limit angle of the 101st order, a further diffraction order (cf. output ray 7 in FIG. 1) occurs, which drains the Littrow order energy. The part of the reflected-back effective radiation allocated to these irradiation angles is reflected back with less energy than the part of the effective radiation belonging to irradiation angles larger than 78.691°.

Using the Littrow grating 1 in an irradiation geometry of this kind as an end mirror in a laser resonator leads in several laser cycles to a noticeable weakening of circulating wavelengths belonging to Littrow angles which are smaller than 78.691°. A narrowing of the bandwidth is immediately allocated to this narrowing of the divergence owing to grating dispersion. The tolerance angle from which the further diffraction order weakening the reflection efficiency occurs can be changed, e.g. lowered, by changing the irradiation angle of the main ray of the divergent light beam.

The foregoing description, drawings and examples merely explain and illustrate the invention and the invention is not limited thereto except insofar as the appended claims are so limited, as those skilled in the art who have the present disclosure before them will be able to make modifications and variations therein without departing from the scope of the invention.

What is claimed is:

1. An optical arrangement with a light source which emits coherent light of a specific wavelength and with an optical Littrow grating, arranged at a specific Littrow angle $\theta_L$, with a multiplicity of parallel diffraction structures following one another periodically at an interval of in each case one specific grating period and arranged on a substrate predetermining a base area, characterised in that the light wavelength, the grating period and the Littrow angle $\theta_L$ are tuned to one another in such a way that the Littrow grating is used in one of the largest diffraction orders m for light reflected back at the Littrow angle $\theta_L$, which still fulfils the condition:

$$(2(m+1)/m-1)\sin(\theta_L) \geq 1.$$

2. The optical arrangement according to claim 1, characterised in that the light of the light source has a TM polarisation in respect of the Littrow grating.

3. The optical arrangement according to claim 1, characterised by a light wavelength which is smaller than 350 nm.

4. A Littrow grating for use in an optical arrangement with a light source which emits coherent light of a specific wavelength, arranged at a specific Littrow angle $\theta_L$, with a multiplicity of parallel diffraction structures following one another periodically at an interval of in each case one specific grating period and arranged on a substrate predetermining a base area, characterised in that the light wavelength, the grating period and the Littrow angle $\theta_L$ are tuned to one another in such a way that the Littrow grating is used in one of the largest diffraction orders m for light reflected back at the Littrow angle $\theta_L$, which still fulfils the condition:

$$(2(m+1)/m-1)\sin(\theta_L) \geq 1.$$

5. The Littrow grating according to claim 4, characterised in that the diffraction structures have in each case a blaze flank inclined substantially at the Littrow angle $\theta_L$ to the base area.

6. The Littrow grating according to claim 5, characterised in that the diffraction structures comprise a counter-flank, wherein the blaze flank and the counter-flank form an apex angle ($\alpha$) in the vertex of a diffraction structure which is smaller than 90°.

7. The Littrow grating according to claim 4, characterised in that it consists of quartz glass.

8. The Littrow grating according to claim 4, characterised in that it has a coating which increases reflectivity.

9. The Littrow grating according to claim 8, characterised in that the coating is an aluminium coating.

10. A method of using a Littrow grating according to claim 4, wherein the method comprises the step of reducing divergence of the light source.

11. A method of using a Littrow grating according to claim 4, wherein the method comprises the step of using the Littrow grating as an end mirror in a laser resonator for narrowing bandwidth.

* * * * *